US009092810B2

(12) United States Patent
Kajamohideen et al.

(10) Patent No.: US 9,092,810 B2
(45) Date of Patent: Jul. 28, 2015

(54) METHODS AND SYSTEMS FOR MERCHANDISING PRODUCTS IN BUNDLES IN AN ONLINE MARKETPLACE

(75) Inventors: Shakul Hameed Kajamohideen, San Jose, CA (US); Jigar Chandrakant Desai, Fremont, CA (US)

(73) Assignee: eBay Inc., San Jose, CA (US)

( * ) Notice: Subject to any disclaimer, the term of this patent is extended or adjusted under 35 U.S.C. 154(b) by 78 days.

(21) Appl. No.: 13/084,356

(22) Filed: Apr. 11, 2011

(65) Prior Publication Data

US 2012/0259687 A1    Oct. 11, 2012

(51) Int. Cl.
*G06Q 30/00* (2012.01)
*G06Q 30/06* (2012.01)
*G06Q 30/02* (2012.01)

(52) U.S. Cl.
CPC ........ *G06Q 30/0601* (2013.01); *G06Q 30/0222* (2013.01); *G06Q 30/0223* (2013.01)

(58) Field of Classification Search
USPC ...................................................... 705/14.23
See application file for complete search history.

(56) References Cited

U.S. PATENT DOCUMENTS

| | | | | |
|---|---|---|---|---|
| 5,331,543 A | * | 7/1994 | Yajima et al. | 705/31 |
| 6,138,105 A | * | 10/2000 | Walker et al. | 705/14.41 |
| 6,285,986 B1 | | 9/2001 | Andrews | |
| 6,598,026 B1 | | 7/2003 | Ojha et al. | |
| 6,873,967 B1 | * | 3/2005 | Kalagnanam et al. | 705/26.44 |
| 7,386,485 B1 | | 6/2008 | Mussman et al. | |
| 7,577,582 B1 | | 8/2009 | Ojha et al. | |
| 7,640,188 B2 | | 12/2009 | Jaffe | |
| 8,078,503 B1 | | 12/2011 | Mussman | |
| 8,126,772 B1 | | 2/2012 | Lefebvre | |
| 2001/0054013 A1 | | 12/2001 | Song | |
| 2002/0046124 A1 | | 4/2002 | Alderucci et al. | |
| 2003/0033218 A1 | * | 2/2003 | Flaxer et al. | 705/27 |
| 2006/0100889 A1 | | 5/2006 | Gosko | |
| 2007/0226052 A1 | * | 9/2007 | Abbott | 705/14 |
| 2008/0091530 A1 | | 4/2008 | Egnatios et al. | |
| 2009/0248540 A1 | * | 10/2009 | Anderson et al. | 705/26 |
| 2009/0307144 A1 | * | 12/2009 | Tutone | 705/80 |
| 2009/0327064 A1 | * | 12/2009 | Ku | 705/14.23 |

(Continued)

OTHER PUBLICATIONS

Zhou et al., "Managing stochastic inventory systems with free shipping option", European Journal of Operational Research, vol. 196, Issue 1, Jul. 1, 2009, pp. 186-197.*

(Continued)

*Primary Examiner* — John G Weiss
*Assistant Examiner* — Scott C Anderson
(74) *Attorney, Agent, or Firm* — Schwegman Lundberg & Woessner, P.A.

(57) ABSTRACT

A method and a system for providing product bundles are described. In some instances, the method begins by receiving a request for a view product interface. The view product interface includes a description of a primary product offered for sale by a seller and indicates that a first item is for sale by the seller where the first item is an instance of the primary product. Next, a product bundle definition for the primary product by the seller is identified. The bundle includes a plurality of secondary products selectable by a buyer. An inventory of the seller is accessed to identify a second item for sale that is an instance of a secondary product. The view product interface is provided and includes the description of the primary product and a description of the bundle that includes a description of the second item.

16 Claims, 6 Drawing Sheets

(56) References Cited

U.S. PATENT DOCUMENTS

2010/0281026 A1 11/2010 Choi
2011/0082734 A1 4/2011 Zhang et al.

OTHER PUBLICATIONS

"UPC", computalabel.com, Jun. 29, 2007, on line at computalabel.com/aboutupc.html.*

"U.S. Appl. No. 12/573,000, Response filed Oct. 19, 2012 to Final Office Action mailed Jul. 19, 2012", 11 pgs.

"U.S. Appl. No. 12/573,000, Final Office Action mailed Jul. 19, 2012", 12 pgs.

"U.S. Appl. No. 12/573,000, Non Final Office Action mailed Mar. 30, 2012", 18 pgs.

"U.S. Appl. No. 12/573,000, Non Final Office Action mailed Jun. 19, 2014", 16 pgs.

"U.S. Appl. No. 12/573,000, Non Final Office Action mailed Oct. 14, 2014", 20 pgs.

"U.S. Appl. No. 12/573,000, Response filed Jan. 14, 2015 to Non Final Office Action mailed Oct. 14, 2014", 16 pgs.

"U.S. Appl. No. 12/573,000, Response filed Jul. 2, 2012 to Non Final Office Action mailed Mar. 30, 2012", 10 pgs.

\* cited by examiner

METHODS AND SYSTEMS FOR MERCHANDISING PRODUCTS IN BUNDLES IN AN ONLINE MARKETPLACE

TECHNICAL FIELD

The present application relates generally to the technical field of data management and processing, and in one specific example, to merchandising products in bundles in an online marketplace.

BACKGROUND

An online marketplace is a virtual meeting place made possible by networked computers, where buyers and sellers can interact to exchange goods and services. In online marketplaces, sellers list items for sale. Potential buyers may search for, or browse, the items for sale and purchase an item from a seller. A seller may list more than one item for sale in the online marketplace. A buyer may purchase more than one item from a seller. With conventional online marketplaces, sellers typically have limited options when it comes to promoting their items, and particularly, providing potential buyers with incentives to purchase multiple items.

BRIEF DESCRIPTION OF THE DRAWINGS

Some embodiments are illustrated by way of example and not limitation in the figures of the accompanying drawings in which.

DETAILED DESCRIPTION

Example methods and systems to provide product bundles are described. In the following description, for purposes of explanation, numerous specific details are set forth in order to provide a thorough understanding of example embodiments. It will be evident, however, to one skilled in the art that the present invention may be practiced without these specific details.

As used herein, the term "product" refers to a good for which there exists a predefined description, such as might be found in a product catalog. Accordingly, a product may be identified by a product name, trade name, part name or number, a stock-keeping unit (SKU) number, universal product code (UPC), bar code, international standard book number (ISBN), or other product identifier. The terms "item" and "item for sale" refer to a specific instance of a product. As such, when a seller is listing an item for sale via an online marketplace, if the item corresponds with a particular product in a product catalog made available by the online marketplace, by selecting the corresponding product the seller can auto-populate all or some of the various attributes and description that make up an item listing.

With conventional online marketplaces, sellers may list two or more related, but different, products for sale to potential buyers. The related products may be listed separately in the online marketplace, such that each product has its own item listing. In some instances, a seller may embed one or more links in a particular listing to one or more listings of related products. Alternatively, a seller may manually bundle one or more products into a single advertisement or listing within the online marketplace, for example, by generating a single listing that describes two or more related products being offered together.

Consistent with some embodiments of the invention, systems and methods enable sellers to define product bundles and thereby provide sellers the opportunity to allow a buyer to select and purchase multiple related products being offered via independent listings by the seller. In defining a product bundle, the seller may provide a discount or some other incentive to the buyer who buys multiple products from the seller. The seller may benefit by having higher sales volume and reduced transaction costs. A "bundle," as used herein, is the purchase of two or more items from a selection of products sold by a seller. A bundle may or may not be predicated on an incentive provided by the seller.

Figure 1:
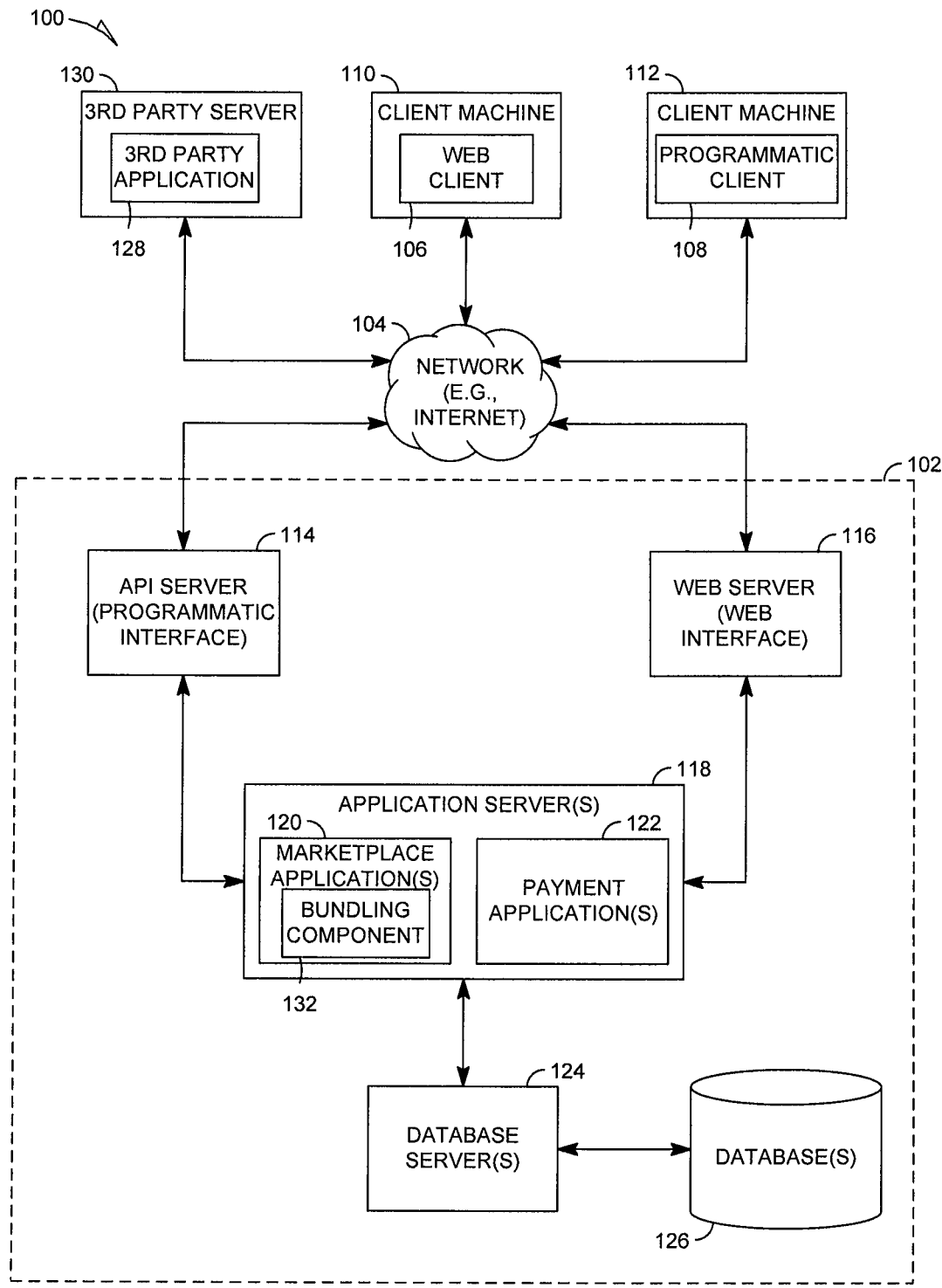
FIG. 1 is a network diagram depicting a client-server system, within which one example embodiment may be deployed.

FIG. 1 is a network diagram depicting a client-server system 100, within which one example embodiment may be deployed. A networked system 102, in the example form of a network-based marketplace or publication system, provides server-side functionality, via a network 104 (e.g., the Internet or Wide Area Network (WAN)) to one or more clients. FIG. 1 illustrates, for example, a web client 106 (e.g., a browser), and a programmatic client 108 executing on respective client machines 110 and 112.

An Application Programming Interface (API) server 114 and a web server 116 are coupled to, and provide programmatic and web interfaces respectively to, one or more application servers 118. The application servers 118 host one or more marketplace applications 120 and payment applications 122. A bundling component 132 may be incorporated into marketplace applications 120. The application servers 118 are, in turn, shown to be coupled to one or more database servers 124 that facilitate access to one or more databases 126.

The marketplace applications 120 may provide a number of marketplace functions and services to users that access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of the networked system 102, in alternative embodiments, the payment applications 122 may form part of a payment service that is separate and distinct from the networked system 102.

Further, while the system 100 shown in FIG. 1 employs a client-server architecture, the present invention is of course not limited to such an architecture, and could equally well find application in a distributed, or peer-to-peer, architecture system, for example. The various marketplace and payment applications 120 and 122 could also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace or payment functions that are supported by the relevant applications of the networked system 102.

Figure 2:
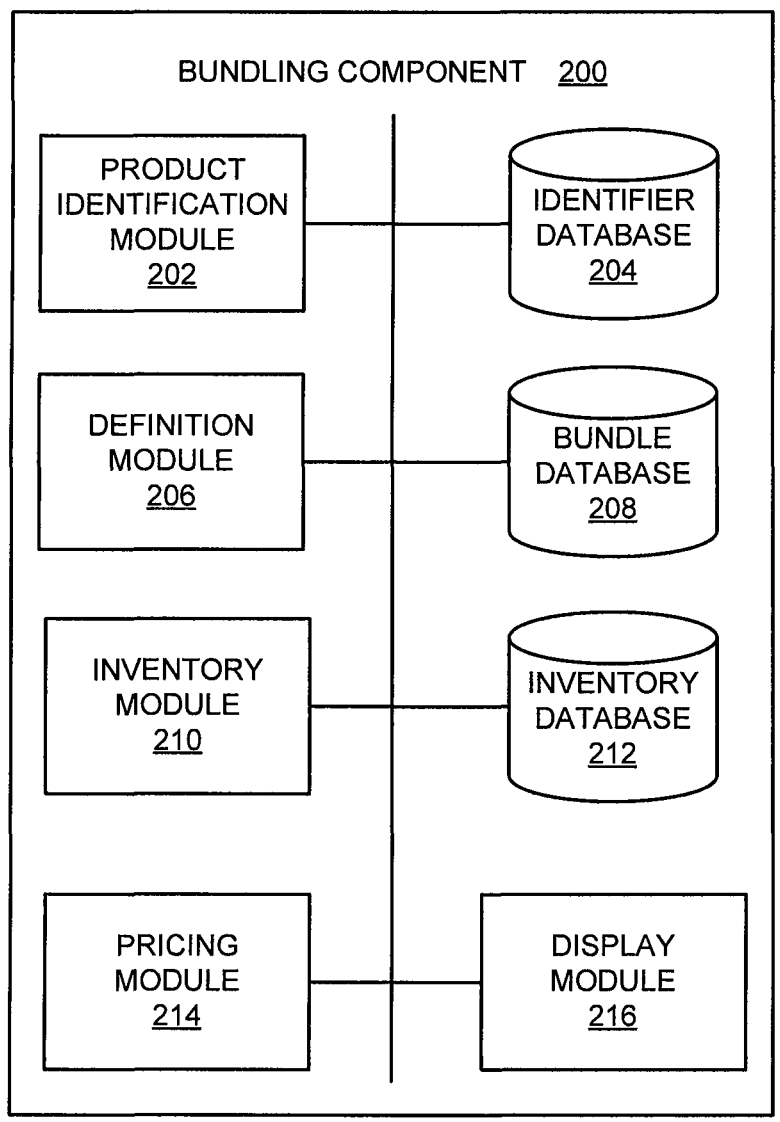
FIG. 2 is a block diagram of an example bundling system according to various embodiments.

FIG. 2 is a block diagram of an example bundling component 200 according to various embodiments. In some instances, the bundling component 200 may be included in the marketplace applications 120 as the bundling component 132. The bundling component 200 may be implemented in hardware, software, or a combination of hardware and software. In some instances, the bundling component 200 has, or is implemented with, one or more processors. The bundling component 200 may receive input from a seller via the web interface supported by the web server 116 or the programmatic interface supported by the API server 114.

A product identification module 202 is configured to identify one or more products for sale by the seller in the online marketplace. The product identification module may identify an item as a particular product using a product identifier such as a name, trade name, part name or number, a stock-keeping unit (SKU) number, universal product code (UPC) bar code, international standard book number (ISBN), or other product identifier provided by a seller via a seller device. The product identification module 202 may access an identifier database 204 to compare a received product identification to a stored product identification. The identifier database 204 may store a description of a product, along with text, images, video, or other media. It may be desirable to use product identifiers to define a bundle instead of using identifiers of particular listings or a particular item so that the bundles may be offered in connection with subsequent listings or items corresponding to the product without the seller having to redefine the bundle.

The product identification module 202 may provide a search function to identify SKUs for products by keyword. The product identification module 202 may further access an inventory database 212 (discussed in greater detail below) to determine for which products the seller has items for sale.

A definition module 206 is configured to manage bundles defined by a seller. The definition module 206 receives a first product identifier assigned to a first product, referred to as a "primary identifier." The primary identifier may be assigned to a primary product in a product bundle. A primary product may be a product that a buyer may purchase before purchasing other, secondary products. Some bundles may include more than one primary product. For example, a primary product may be a camera that is associated with accessories such as tripods, lenses, cases, additional memory, photograph printing supplies, digital imaging software, flashes, etc. The accessories may be referred to as "secondary products" that are assigned respective "secondary identifiers." The accessories may be listed for sale in the online marketplace separately from the bundles. The use of the terms "primary product," "primary identifier," "secondary product," and "secondary identifier" are used for illustration and are not used in a limiting sense.

The definition module 206 may provide one or more interfaces that allow a seller to define a product bundle. To define a product bundle, the seller selects the primary identifier of the primary product via an interface. The seller subsequently provides or selects one or more secondary identifiers of secondary products that may be bundled with the primary product.

The secondary products may be grouped according to type by the seller or by the definition module 206. To continue the example of a camera bundle, various lenses offered as secondary products in the bundle may be grouped as "lenses." The group "lenses" may include, for example, zoom lenses, portrait lenses, micro lenses, etc.

In some embodiments, the seller may define one or more groups or secondary products that are associated with each bundle by default. The default bundles may be added to a primary product to each listing posted by the seller or to a portion of the listings posted by the seller. The portion may be defined based on category, brand, or other aspect of the primary product. These groups or secondary products may include gift certificates or warrantees being offered by the seller. Some groups may be further defined to limit the number of products in a particular group that can be purchased by the buyer. For example, a buyer may be limited to purchasing one warrantee with any particular bundle.

Via one or more interfaces, the seller optionally defines or selects one or more incentives associated with the bundle. An incentive is a discount or other benefit afforded to a buyer of a bundle that is not afforded to a buyer who does not purchase a bundle. The incentives may include discounts on individual primary or secondary products, a discount based on the number of products added to a bundle, a discount based on a total price of a bundle, a discount on shipping (e.g., secondary items ship free with the primary item), a warrantee or extended warrantee, a more generous return policy, a "buy one, get one free" offer, a discount applied to additional items, or the like. The seller may further dictate other aspects of the bundle such as start date of a bundle, end date of a bundle, a number of items that a buyer can select to be in a bundle, a ranking of inventory to be included in the bundle (discussed in more detail below), cross-bundling agreements with other sellers (discussed in more detail below), or the like.

In some instances, the seller may provide a spreadsheet that defines one or more bundles. The spreadsheet may include a bundle name, start date, end date, ability to modify, bundle status, primary product identifier, group titles, secondary product identifiers (according to group), discount type, discount value, and the like. The spreadsheet may be accessed by the definition module 206 and analyzed to store the defined bundles in the bundle database 208.

Once defined, the product bundle definition is stored in a bundle database 208. The product bundle definition may define a one-to-many mapping of primary products to secondary products, where one primary product is mapped to each of several secondary products. If the bundle definition defines more than one product as a primary product, the product bundle definition may define several one-to-many mappings, where each of the primary products is mapped to one or more secondary products. Alternatively, the product bundle may be defined a many-to-many mapping where one or more of the primary products and the secondary products are mapped to one another. In some instances, bidirectional mappings may be used such that if one product is mapped to another, that other product is, in turn, mapped back to the one product. The bidirectional mapping is where when the relation between the primary product and secondary products are defined so that when secondary product is viewed by buyer, the primary product is shown to the buyer through reverse mapping. For example, if a seller defines a relation between a game console (primary product) and list of popular games (secondary products), the reverse mapping causes the console to be shown when any of the games are viewed.

The definition module 206 may further allow a seller to manage the product bundle definitions. For example, a seller may view, modify, enable, disable, or delete one or more of the defined bundles.

An inventory module 210 monitors the inventory information concerning items available for sale by the seller. The seller may store his inventory information in an inventory database 212 that can be accessed by the API server 114. The inventory module 210 further accesses the bundle database 208 to determine which products are included in the product bundle definitions, and for each included product, whether the seller actually has a corresponding item available. For example, using the definition module 206, the seller may have previously defined a camera bundle as including portrait lenses and zoom lenses. However, the seller may have sold out of zoom lenses and therefore may no longer have those items to sell. In this case, the inventory module 210 accesses the inventory database 212, determines that the seller has no zoom lenses to sell, and excludes zoom lenses when presenting a camera bundle to a potential buyer.

In some instances, a seller may rank certain items assigned to the same product identifier to indicate which should be given preferable treatment for inclusion in a bundle. The items may be ranked according to price, condition, shipping costs, acquisition date, or the like. For example, new items may be given a rank of "1" and used items may be given a rank of "2." The seller may indicate that the items in rank 1 are to be presented first, and when those are sold out, items in rank 2 are to be presented. The ranking may be used to ensure proper item rotation. As the seller acquires more items having the same product identifier to sell, the remaining items may be re-ranked.

In some embodiments, the seller may establish cross-bundling agreements with other sellers. For example, the seller may include a product in a product bundle definition that he does not have in inventory or that is frequently sold out. The other seller may sell the same product but have those items in inventory. In these instances, the seller may include the other seller's items in a bundle sold to a buyer. The cross-bundled items may be ranked in the seller's inventory database 212 so as to sell the seller's items before selling the other seller's items.

A pricing module 214 is configured to determine a price of a bundle based on a product bundle definition of the bundle accessed from the bundle database 208. The pricing is defined by the seller and may be based on the particular items selected by the buyer, the sum of the prices of the products added to the bundle, the number of products in the bundle, or other criteria. The pricing module 210 may apply one or more discounts or credits to the selected bundle. In some instances, the discounts or a value of the incentives may be proportionally applied according to the price of each item in the bundle.

A display module 216 provides interfaces to the seller and the buyer. The interfaces provided to the seller include bundle definition interfaces and inventory interfaces. The interfaces provided to the buyer include a view item page including an option to buy a bundle and pop-up windows to display information about bundled items.

Figure 3:
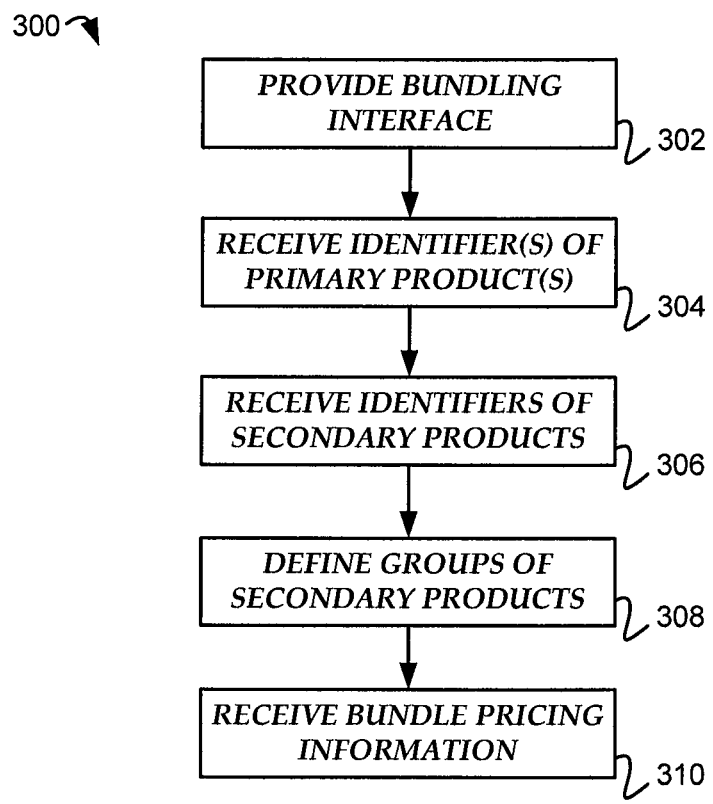
FIG. 3 is a flowchart of an example method to define product bundles according to various embodiments.

FIG. 3 is a flowchart of an example method 300 to define product bundles according to various embodiments. Specifically, FIG. 3 illustrates the method operations involved in generating a product bundle definition for a product bundle. The method 300 may be performed by the bundling component 200.

In an operation 302, a bundling interface is provided to the seller by, for example, the display module 216. Via the bundling interface, information used to define the bundle is received from the user. For example, in an operation 304, one or more identifiers assigned to one or more primary products are received.

In operation 306, identifiers of secondary products are received. In an optional operation 308, groups of the secondary products are defined. In some instances, operation 308 may be performed before operation 306. Operations 306 and 308 (or operations 308 and 306) may be performed repeatedly to add multiple groups of secondary products.

In an operation 310, bundle pricing information is received. Operation 310 may further include receiving other incentives associated with the bundle.

Figure 4:
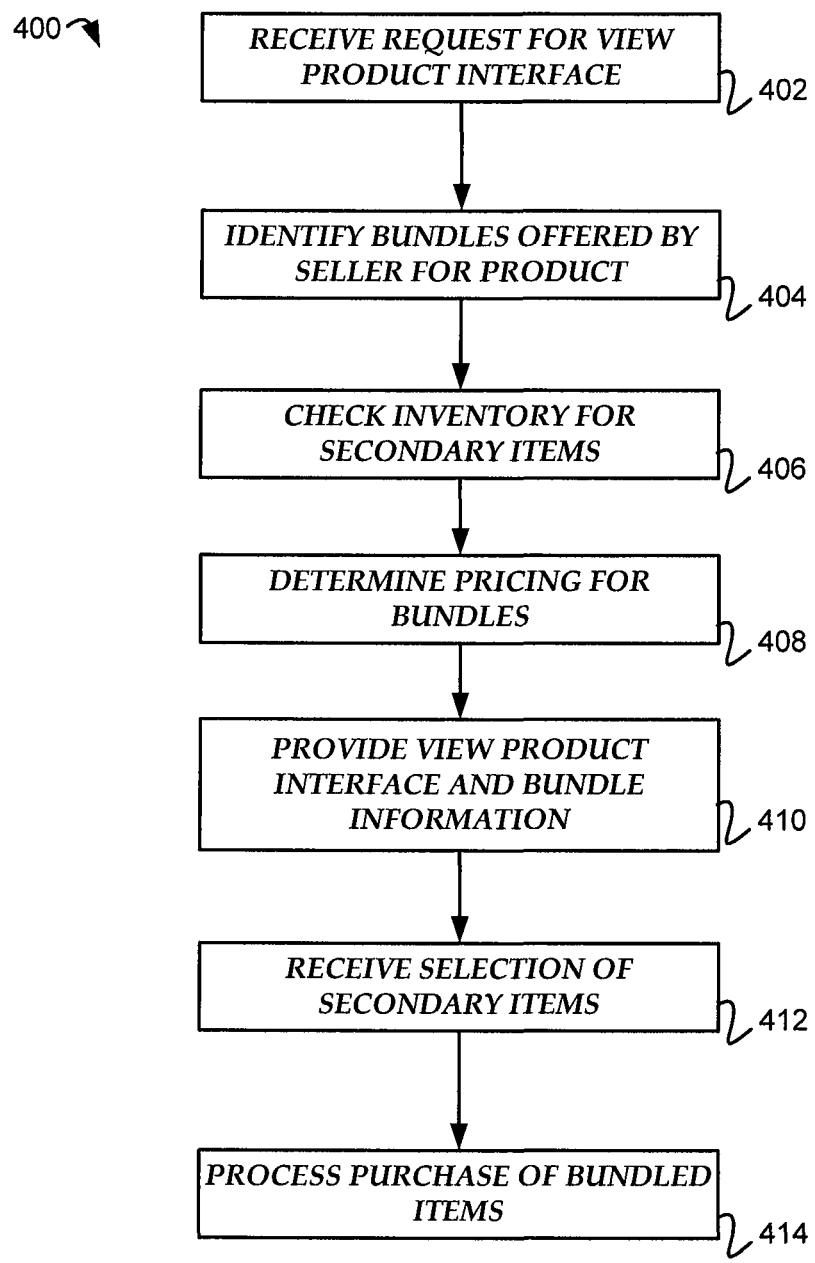
FIG. 4 is a flowchart of an example method to provide product bundles according to various embodiments.

FIG. 4 is a flowchart of an example method 400 to provide product bundles according to various embodiments. The method 400 may be performed by the bundling component 200.

In an operation 402, a request is received for a view product interface of a primary product. The request may be received via a keyword search, a browsing session, a featured link, or the like. The view product interface includes, for example, a description of the product, one or more pictures of the product, information about the seller, price and shipping information, and bundle information.

In an operation 404, the bundles offered by the seller for the primary product are identified. The bundles actually being offered may depend on the start date or end date of previously defined bundles.

In an operation 406, the inventory database 212 is checked for the secondary items in the bundle. In an operation 408, the pricing for the bundles is determined.

In an operation 410, a view product interface is provided for display to a buyer. An example of a view product interface is provided in FIG. 5. The view product interface includes an option to buy a bundle and the secondary items that may be included in the bundle. The view product interface may include a link to a more detailed description of each secondary item, which may be shown in a pop-up window. The user may select one or more items to add to a bundle or specify a quantity of a secondary item to add to a bundle. The user may also specify a number of bundles to purchase via the interface. Items not in the seller's inventory but included in the definition of the bundle may be automatically excluded from the view product interface.

In an operation 412, the selection of the secondary items is received (including quantities) and, in an operation 414, the purchase of the bundled items is processed.

Figure 5:
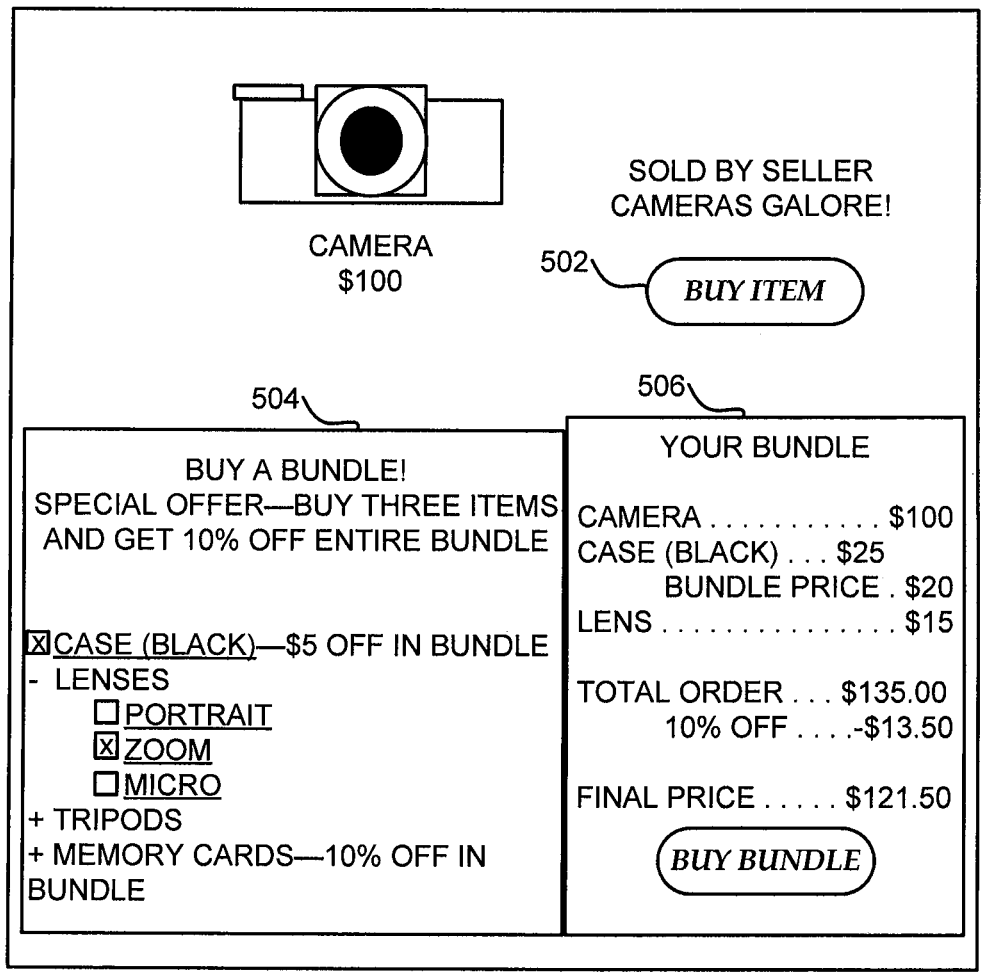
FIG. 5 is an example portion of a user interface for providing product bundles according to some embodiments.

FIG. 5 is an example portion of a user interface 500 for providing product bundles according to some embodiments. The interface 500 includes a description of a primary product, a camera, and an option 502 to purchase the camera without purchasing additional, bundled, items. A bundle interface 504 includes an indication that a buyer receives a discount of the bundle, as depicted, 10% off if the buyer buys three items. The bundled interface 504 also includes an expandable list of secondary items. The expandable list is expandable by group name and is indicated by the symbol "+". An expanded list is indicated by the symbol "−". A secondary item is preceded by a checkbox and is underlined to indicate a link to a more detailed product description. The link may cause a pop-up window to open containing the description. The checkbox may be replaced by a field where a buyer may indicate a desired quantity of the secondary item. Secondary items not available at the time may be excluded in the bundle interface 504.

A buying interface 506 displays a list of the primary product and of the selected secondary products. The buying interface may be updated each time a buyer changes a selection in the bundle interface 504. The buying interface 506 includes the discounted prices of the items in the bundle and applies any further discounts to the bundle as the secondary items are selected.

Figure 6:
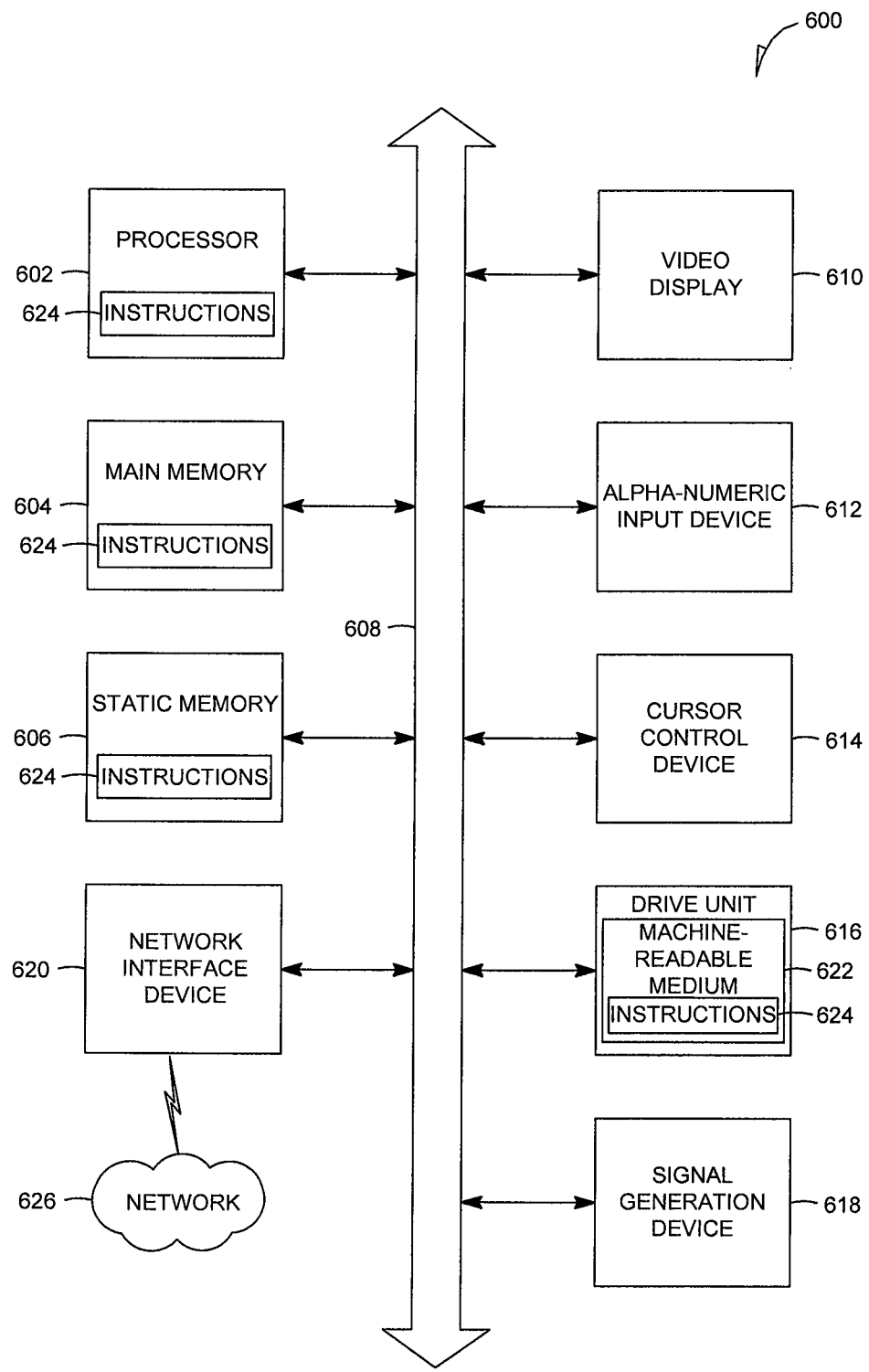
FIG. 6 is a diagrammatic representation of machine in the example form of a computer system within which a set of instructions, for causing the machine to perform any one or more of the methodologies discussed herein, may be executed.

FIG. 6 is a diagrammatic representation of machine 600 in the example form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU) a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a cursor control device 614 (e.g., a mouse), a disk drive unit 616, a signal generation device 618 (e.g., a speaker), a network interface device 620, and may include a touchscreen (not shown).

The disk drive unit 616 includes a machine-readable medium 622 on which is stored one or more sets of instructions (e.g., software 624) embodying any one or more of the methodologies or functions described herein. The software 624 may also reside, completely or at least partially, within the main memory 604 and/or within the processor 602 during execution thereof by the computer system 600, the main memory 604 and the processor 602 also constituting machine-readable media.

The software 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, a method and system to provide product bundles have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
receiving a product bundle definition from a first client device corresponding to a first seller, the product bundle definition defining a bundle and specifying a discount that is applicable to a price of the bundle, the bundle comprising a primary product offered for sale by the first seller and one of a plurality of secondary products selectable for purchase with the primary product, at least one of the plurality of secondary products being offered for sale by a second seller;

receiving, from a second client device corresponding to a user, a request for a view product interface of the primary product, the view product interface including a description of the primary product offered for sale by the first seller;

accessing the product bundle definition corresponding to the primary product;

accessing inventory information of the second seller, the inventory information specifying an availability of the at least one secondary product offered for sale by the second seller;

determining the availability of the at least one secondary product offered for sale by the second seller based on the inventory information of the second seller;

determining, using one or more processors, a relative rank of the at least one secondary product offered for sale by the second seller;

based on the availability and the relative rank of the at least one secondary product offered for sale by the second seller, providing instructions to the second client device to present the view product interface, the view product interface including the description of the primary product and a description of the bundle, the description of the bundle including a description of the discount and the availability of the at least one secondary product offered for sale by the second seller; and in response to receiving a selection of the at least one secondary product offered for sale by the second seller for purchase with the primary product as the bundle, determining a total price of the bundle by applying the discount specified in the product definition bundle to a sum of a price of the primary product and the at least one secondary product offered for sale by the second seller.

2. The method of claim 1, wherein the discount is applied based on a selection of an additional secondary product for purchase with the primary product and the available secondary product.

3. The method of claim 1, further comprising identifying a first portion of the plurality of secondary products as a first group and identifying a second portion of the plurality of secondary products as a second group.

4. The method of claim 1, wherein the receiving of the product bundle definition from the seller comprises:
providing a bundling interface to the first device, the bundling interface used by the first seller to define the bundle;
receiving the identifier of the primary product;
receiving respective identifiers of the plurality of secondary products; and
receiving one or more incentives associated with the bundle.

5. The method of claim 4, further comprising:
defining one or more groups of the plurality of secondary products.

6. The method of claim 4, wherein one or more of the incentives is based on a defined group of the one or more groups.

7. The method of claim 1, further comprising waiving a shipping fee for the second item.

8. The method of claim 1, wherein the product bundle definition is accessed using an identifier of the first seller and an identifier of the primary product.

9. The method of claim 1, wherein the relative rank is based on a price, a condition, a shipping cost, or an acquisition date.

10. The method of claim 1, wherein the incentive specified by the product bundle definition is applicable to a sum of a price of the-primary product and at least one secondary product of the plurality of secondary products.

11. A system comprising:
one or more processors;
a definition module, comprising at least one of the one or more processors, to receive a product bundle definition from a first client device corresponding to a first seller, the product bundle definition defining a bundle and specifying a discount that is applicable to a price of the bundle, the bundle comprising a primary product offered for sale by the seller and one of a plurality of secondary products selectable for purchase with the primary product, at least one of the plurality of secondary products being offered for sale by a second seller;
a product identification module, comprising at least one of the one or more processors, to receive, from a second client device corresponding to a user, a request for a view product interface of the primary product, the view product interface including a description of the primary product offered for sale by the first seller;
the definition module, comprising at least one of the one or more processors, further to access the product bundle definition corresponding to the primary product;
an inventory module, comprising at least one of the one or more processors, to access inventory information of the second seller, the inventory information specifying an availability of the at least one secondary product offered for sale by the second seller, the inventory module, further to determine the availability of the at least one secondary product offered for sale by the second seller based on the inventory information of the seller, and determine a relative rank of the at least one secondary product offered for sale by the second seller;
a display module, comprising at least one of the one or more processors, to provide instructions to the second client device to present the view product interface to the user based on the availability and relative rank of the at least one secondary product offered for sale by the second seller, the view product interface including the description of the primary product and a description of the bundle, the description of the bundle including a description of the discount and the at least one secondary product offered for sale by the second seller; and
a pricing module, comprising at least one of the one or more processors, to determine a total price of the bundle by applying the discount specified in the product definition bundle to a sum of a price of the primary product and the at least one secondary product offered for sale by the second seller in response to a selection of the at least one secondary product offered for sale by the second seller for purchase with the primary product.

12. The system of claim 11, wherein the definition module is further to identify a first portion of the plurality of secondary products as a first group and to identify a second portion of the plurality of secondary products as a second group.

13. The system of claim 11, wherein the definition module is further to provide a bundling interface to the first seller, the bundling interface used by the first seller to define the bundle, provide an identifier of the primary product, provide respective identifiers of the plurality of secondary products, and to provide one or more incentives associated with the bundle.

14. The system of claim 11, wherein the pricing module is further to waive a shipping fee for the second item.

15. The system of claim 11, wherein the definition module is to access the product bundle definition using an identifier of the first seller and an identifier of the primary product.

16. A non-transitory machine-readable medium having instructions embodied thereon, the instructions executable by one or more processors to perform operations comprising:
receiving a product bundle definition from a first client device corresponding to a first seller, the product bundle definition defining a bundle and specifying a discount that is applicable to a price of the bundle, the bundle comprising a primary product offered for sale by the seller and one of a plurality of secondary products selectable for purchase with the primary product, at least one of the plurality of secondary products being offered for sale by a second seller;
receiving, from a second client device corresponding to a user, a request for a view product interface of the primary product, the view product interface including a description of the primary product offered for sale by the first seller;
accessing the product bundle definition corresponding to the primary product;

accessing inventory information of the second seller, the inventory information specifying an availability of the at least one secondary product offered for sale by the second seller;

determining the availability of the at least one secondary product offered for sale by the second seller based on the inventory information of the second seller;

determining, using one or more processors, a relative rank of the at least one secondary product offered for sale by the second seller;

based on the availability and the relative rank of the at least one secondary product offered for sale by the second seller, providing instructions to the second client device to present the view product interface, the view product interface including the description of the primary product and a description of the bundle, the description of the bundle including a description of the discount and the at least one secondary product offered for sale by the second seller; and in response to receiving a selection of the at least one secondary product offered for sale by the second seller for purchase with the primary product as the bundle, determining a total price of the bundle by applying the discount specified in the product definition bundle to a sum of a price of the primary product and the at least one secondary product offered for sale by the second seller.

* * * * *

UNITED STATES PATENT AND TRADEMARK OFFICE
CERTIFICATE OF CORRECTION

| | | |
|---|---|---|
| PATENT NO. | : 9,092,810 B2 | Page 1 of 1 |
| APPLICATION NO. | : 13/084356 | |
| DATED | : July 28, 2015 | |
| INVENTOR(S) | : Kajamohideen et al. | |

It is certified that error appears in the above-identified patent and that said Letters Patent is hereby corrected as shown below:

In the Claims

In column 9, line 48, in Claim 10, delete "the-primary" and insert --the primary--, therefor Signed and Sealed this
Ninth Day of February, 2016

Michelle K. Lee
*Director of the United States Patent and Trademark Office*